July 7, 1964
D. L. RALSTON
3,139,710
SHARPENER FOR LAWNMOWER BLADES
Filed June 4, 1963
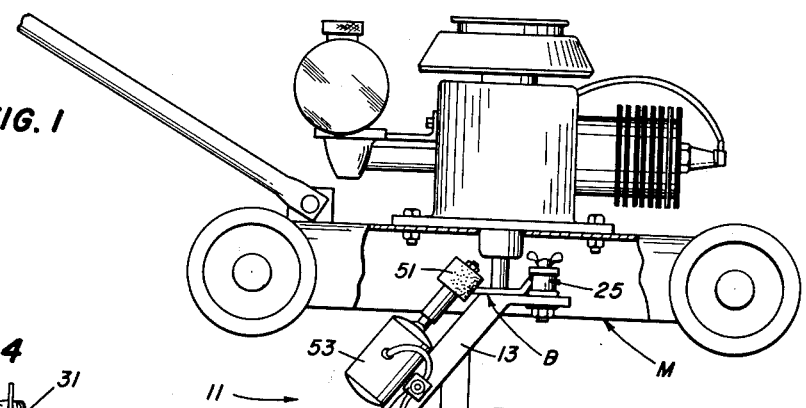
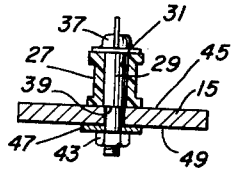
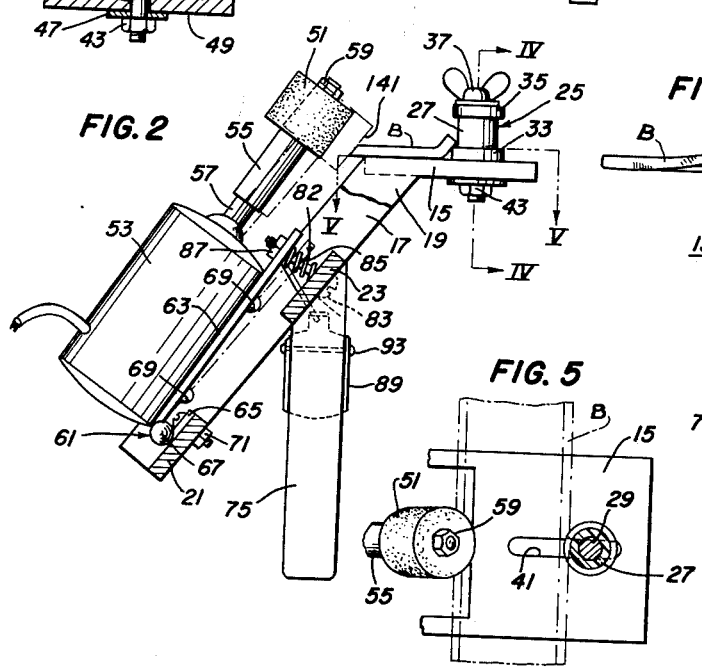
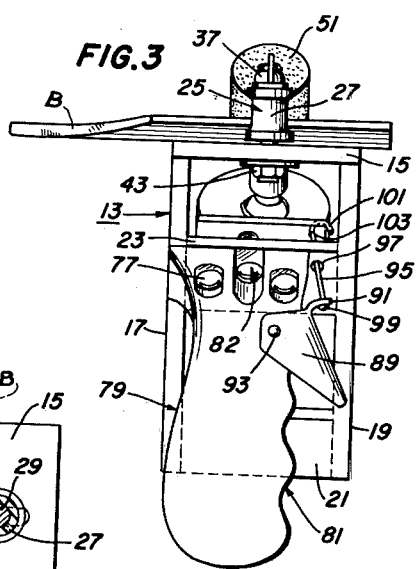
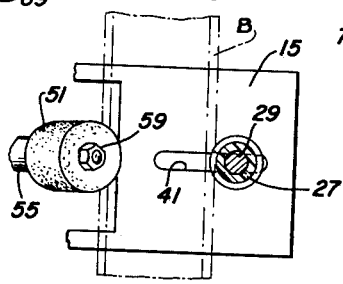
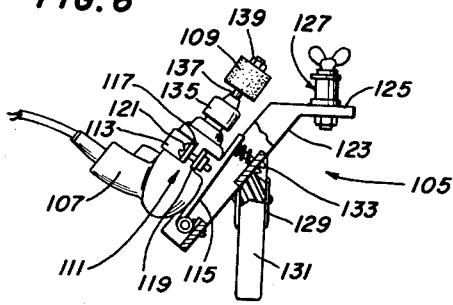
INVENTOR.
DON L. RALSTON
BY John R. Walker, III
Attorney

United States Patent Office 3,139,710
Patented July 7, 1964

3,139,710
SHARPENER FOR LAWNMOWER BLADES
Don L. Ralston, 4428 Beatty Cove, Memphis, Tenn., assignor of one-half to Dr. S. I. Wener, Memphis, Tenn.
Filed June 4, 1963, Ser. No. 285,479
4 Claims. (Cl. 51—249)

This invention relates to sharpening devices generally and is particularly directed to a tool for sharpening the blade of the ordinary rotary type lawnmower.

In the well-known and generally used gasoline or electric powered rotary type lawnmower, a single blade is rotatably driven in a horizontal plane to cut the grass. The blade is generally mounted on a vertical drive shaft or crank shaft of the driving motor by a screw fastener disposed in the center of the blade which extends through a hole therein and is threadedly attached to the end of the shaft. Certain makes of mowers have a pair of friction discs or the like mounted between the shaft and the blade to allow the blade to yield somewhat when it strikes a rock or other such foreign object. The cutting portions of the blade are along the opposite disposed leading edges thereof and extend a short distance from the blade ends. These cutting portions are ordinarily beveled, with the bevel being toward the upper surface of the blade and with the cutting edge being along the lower surface thereof. Mower blades currently in use also are generally provided with an upturned portion along the trailing edge of each end, thereby to raise the grass as it is cut and to expel it through a tunnel-like opening generally provided in the blade housing.

As is well-known, in order for the mower to work efficiently, the blade must be kept sharp. Heretofore, the general practice in sharpening the blade was to remove the blade from the mower. Removing the blade from the mower was sometimes difficult. When the mower sets up over a season, or if the blade has not been removed for some time, the bolt holding the blade to the shaft would become corroded. When this occurred, considerable effort was often required to remove the blade. Also, relative to this, the user may not have had the proper wrench to remove the bolt. Further, there was the possibility, particularly when the blade was equipped with a yieldable coupling, that the user would not assemble or install the parts properly. When this was done, there was the resultant likelihood of the blade becoming loose thereby causing unnecessary wear to the various parts and other such malfunctioning of the machine. Also, there was the risk that, while removing or handling the blade, the user would accidentally cut or injure himself.

With the foregoing in mind, the present invention has as its primary object to provide a handy portable lawnmower blade sharpener to sharpen the blade of a rotary type lawnmower without removing the blade from the mower, thereby providing a practical tool for accomplishing this job.

A further object is to provide a lawnmower blade sharpener whereby it is possible for the user to grind the blade consistently at a correct and uniform angle.

A further object is to provide a lawnmower blade sharpener whereby it is possible for the user to grind a substantially equal amount from the opposite ends of the blade, thereby to keep the blade balanced and to eliminate the destructive vibrations to the mower parts.

A further object is to provide a relatively simple lawnmower blade sharpener having few parts and, as such, to facilitate economical manufacture and sale.

A further object is to provide a lawnmower blade sharpener that is adjustable to fit various blade widths of different mowers.

A further object is to provide a lawnmower blade sharpener having a base engaging the underside of the blade as it is sharpened, a guide roller for engaging the trailing edge of the blade, and a motor-driven grinding wheel for sharpening the leading edge of the blade.

A further object is to provide a preferred form of the present invention having a grinding wheel driven by an electric motor which is incorporated as a part of the tool in the manufacture thereof and is for the specific purpose of driving the grinding wheel.

A further object is to provide a modified form of the present invention utilizing an ordinary small electric hand drill with a chuck-mounted grinding wheel attached thereto for the grinding means of the tool.

A further object is generally to improve the design and construction of lawnmower blade sharpeners.

The means by which the foregoing and other objects of the present invention are accomplished and the manner of the accomplishment will be readily understood from the following specification upon reference to the accompanying drawings, in which:

FIG. 1 is an environmental view of the preferred form of the tool of the present invention shown disposed as in use along the blade of a lawnmower.

FIG. 2 is a right side view of the tool as shown in FIG. 1, enlarged, and with a fragmentary portion removed for purposes of clarity.

FIG. 3 is a front view of the device as viewed from the right side of FIG. 2.

FIG. 4 is a vertical sectional view taken as on the line IV—IV of FIG. 2.

FIG. 5 is a horizontal sectional view taken as on the line V—V of FIG. 2 showing the relative disposition of the grinding wheel, roller and base, and showing the lawnmower blade in broken lines.

FIG. 6 is an illustration of the modified form of the present invention utilizing an ordinary small electric drill with a chuck-mounted grinding wheel as the grinding means of the tool, with fragmentary portions of the tool being removed for purposes of clarity.

Referring now to the drawings in which the various parts are indicated by reference characters, tool 11 of the present invention includes a frame 13 and a base member 15 preferably integrally formed with frame 13, as best seen in FIGS. 2 and 3. Frame 13 is substantially rectangular and includes two side members 17, 19 and two cross members 21, 23. The various members of frame 13, with the exception of base member 15, are preferably of substantially the same rectangular cross-sectional dimensions. Base member 15, which may be best seen in FIG. 5, is somewhat larger than cross members 21, 23 and is attached obliquely to side members 17, 19, as seen in FIG. 2. Cross members 21, 23 join side members 17, 19, with the lower surfaces of these members being substantially flush. Frame 13 is preferably of one-piece construction formed as by casting or the like and preferably of aluminum alloy or plastic material.

A guide member 25 is mounted from base member 15. Guide member 25 includes a roller 27 and a pin 29, best seen in FIG. 4. Roller 27 is preferably of plastic material having a bore opening 31 extending therethrough and annular rim-like projections 33, 35 at the opposite ends thereof. Pin 29 has a winged head 37 and a shoulder portion 39. A slotted aperture 41 is provided in base member 15 extending longitudinally thereof. Roller 27 is mounted on base member 15 by pin 29 extending through slot 41 and is fastened by a nut 43. Referring to FIG. 4, it will be seen that shoulder 39 engages the upper surface 45 of base member 15 as the roller is mounted. A washer 47 is preferably provided between nut 43 and lower surface 49 of base member 15. The length of that portion of pin 29 between the lower surface of head 37 and shoulder 39 should be slightly longer than the length of roller 27, thereby allowing the roller to be freely turnable on the pin.

Abrading means is mounted from frame 13 and preferably comprises a grinding wheel 51 driven by a high speed electric motor 53. The attachment of grinding wheel 51 to motor 53 may be of any one of a number of well-known ways. The preferred manner, however, is to mount an arbor 55 on shaft 57 of the motor and to mount a grinding wheel on arbor 55. Arbor 55 is preferably press-mounted on shaft 57 or alternately attached thereto by set screws, not shown. Grinding wheel 51 is of the usual sort and is cylindrical in shape, with a hole through the center through which arbor 55 is fitted and is secured by nut 59. The grinding means of the device is preferably attached to frame 13 by hinge structure 61 which includes hinge halves 63, 65 and a connecting pin 67, as best seen in FIG. 2. Hinge half 63 is somewhat larger than hinge half 65 and is attached to the underside of motor 53 by rivets 69. Screw fasteners 71 are provided to attach hinge half 65 to lower cross member 21, thus mounting motor 53 pivotally from frame 13. A switch 73, as best seen in FIG. 1, is preferably provided to turn motor 53 on and off.

A handle 75 is disposed angularly from frame 13 and is attached to cross member 23 by screw fasteners 77, as best seen in FIG. 3. Handle 75 is preferably of plastic having a hand-grip shape with a rearward side 79 and a forward side 81. The head portions of screw fasteners 77, holding handle 75 to frame 13, are preferably recessed in the handle and are threadedly engaged in cross member 23.

A spring actuated device 82 is provided for limiting the movement of the grinding means of the tool, and in the preferred form includes the screw, spring, and nut assembly 83, 85 and 87, respectively, as best seen in FIG. 2. Screw 83 extends through an aperture provided in cross member 23 and through an aperture provided in the extended portion of hinge half 63, and is threadedly secured by nut 87. Spring 85 is convolutely mounted on screw 83 between member 23 and hinge half 63, and urges hinge half 63 and the grinding means of the tool outwardly from frame 13 and base member 15.

A trigger-like lever 89 is mounted adjacent the forward side 81 of handle 75 and, in the preferred form, includes a U-shaped piece having an outwardly projecting ear 91, as best seen in FIG. 3. Lever 89 is pivotally mounted on handle 75 by a pin 93 which straddle-mounts the lever to the upper forward side portion of the handle. A connector 95 of wire or the like connectingly links lever 89 to hinge half 63. In the preferred form, link 95 extends through an aperture 97 in cross member 23, and has the head portion 99 abuttingly engaging ear 91 and the opposite end portion 101 extending through an opening 103 in hinge half 63 and is secured thereto by looping portion 101 around the end of hinge half 63.

The lawnmower blade sharpening tool 105, shown in FIG. 6, is the modified form and utilizes an ordinary small electric drill 107 with a chuck-mounted grinding wheel 109 as the grinding means of the tool. Modified tool 105 is functionally the same as tool 11; the primary structural difference in the two forms being in the motor driven grinding means and in the fastening means 111 of modified tool 105 provided for mounting and dismounting the drill motor or grinding means from the rest of the tool. Fastening means 111 preferably includes a flexible metal strap 113 which is fixedly attached at one end thereof to hinge half 115 and which is provided with a flanged and apertured portion 117 at the other free end. A corresponding flanged and apertured portion 119 is fixedly attached to hinge half 115 adjacent the right edge thereof. Hinge half 115 of modified tool 105 is preferably contoured to fit drill 107, and flanged and apertured portion 119 is preferably integrally formed therewith. A screw fastener 121 extending through the apertures in portions 117, 119 removably secures drill motor 107 to hinge half 115. The remainder of this modified form of the tool, or those parts for positioning the tool along the lawnmower blade, are substantially the same structurally as corresponding parts of tool 11. Tool 105 thus comprises a frame 123, a base member 125 integrally formed with frame 123, and a roller and pin assembly 127. This modified form also includes similar means for manually actuating the tool 105 and includes a trigger-like lever 29 attached to a handle 131 and a spring-actuated device 133.

Grinding wheel 109 is substantially the same type of cylindrical wheel as grinding wheel 51 of the preferred embodiment and is drivingly attached to collet-type chuck 135 of drill motor 107 by an adapter spindle 137. Spindle 137 is of the usual kind, having a reduced and shouldered portion extending through a central opening in grinding wheel 109 and includes a spindle nut 139 attaching spindle 137 to grinding wheel 109. The spindle and grinding wheel thus comprise an assembly which may be readily engaged or disengaged from drill motor 107 by manipulating chuck 135 in the usual manner.

The preferred form of the tool, having the drive motor component as an integral part of the device, and the modified form of the tool, utilizing a drill motor, are both used in substantially the same way, and the following suggested usage will suffice for both forms.

In sharpening the blade B of mower M, as seen in FIG. 1, the mower is turned on its side against a post or the like. If the mower is of the usual type having a tunnel opening in the blade housing between the two right side wheels, this opening should be disposed upwardly with the mower resting on its left side. The spark plug wire terminal should be removed from the spark plug for safety, and the extension cord of the tool should be plugged into an electrical outlet. The blade B is then turned so that one of the cutting portions at either end thereof is adjacent the tunnel opening. The user may now proceed with sharpening the blade by holding the tool in the position shown in FIG. 1 and moving the tool back and forth along the blade. Care should be exercised, in sharpening the blade, to see that the lower surface of the blade and the upper surface of the base member are in flat face-to-face engagement and that the tool is held thusly with the trailing edge of the blade always against the guide roller. The tool is held with the first and second fingers of the right hand curled around the lever on the handle, and by squeezing the lever, the user can vary the pressure of the grinding wheel against the blade and thus regulate the grinding or cutting action of the wheel. When the lever on the handle is released, the spring-actuated device of the tool holds the respective parts in the positions shown in FIG. 2. Referring to this figure, it will be noted that when the lever on the handle is released, the grinding wheel of the tool is pivoted to a position somewhat away from the leading edge of the blade. This clearance between the grinding wheel and the leading edge is desirable in order for the user to easily remove the tool from the blade and to better control the cutting action of the grinding wheel. Also, in referring to FIG. 2, it will be noted that the grinding position of the grinding wheel 51 is shown in broken lines, and it will be seen that the grinding surface 141 is at an angle relative to base number 15 and, therefore, at an angle relative to the blade.

Because lawnmower blades are of different widths, the guide roller or guiding means of the tool for engaging the trailing edge of the blade is adjustable along the base member of the tool and along the slotted aperture in the base member. To adjust the guide roller, the winged head of the pin fastener mounting the roller is loosened; the guide member is then moved to a proper position along the slot; and then the pin fastener is re-tightened. The above adjustment procedure should be done while the tool is being held against the blade, for when held thusly, it is then possible to better set the clearance between the grinding wheel and the leading edge of the blade.

After the above-described guide roller adjustment has been made, it should not be necessary to re-adjust the roller when the tool is used to sharpen the same mower blade, and it will only be necessary to re-adjust the roller when the tool is used to sharpen the blade of another mower or a blade having a different width than that for which the tool is set.

From the foregoing it is apparent that the present invention provides a very useful tool for quickly and easily sharpening the blade of a rotary type lawnmower without removing the blade from the mower. Further, using the tool facilitates greater accuracy in removing an equal amount of metal from the opposite end portions of the blade, thereby keeping the blade in better balance as it turns and thus preventing unwanted vibration and subsequent wear to the various parts of the mower. The present invention also provides a very effective means for sharpening the blade at a correct angle, thereby increasing the grass-cutting efficiency of the mower.

The modified form of the tool of the present invention is for the user who already has the drill motor counterpart, and it is intended that the frame, base member and guide roller, along with the grinding wheel and spindle assembly, be marketed in kit-like form so that the user may use his already possessed drill motor to drive the tool. It is readily seen that the above components of the modified form of the tool can be marketed without the drive motor and thus at a relatively small cost to the user.

From the foregoing it can be seen that the present invention provides a lawnmower blade sharpening tool whereby the user of the tool may keep his lawnmower operating properly and may thus more readily keep his lawn in a neat and orderly fashion.

Although the present invention has been described in some detail by way of illustration and example for purposes of clarity or understanding, it is to be understood that it is not to be so limited since changes and modifications may be made therein which are within the full intended scope of this invention as hereinafter claimed.

I claim:

1. A tool for use in sharpening the blade of a rotary type lawnmower, the lawnmower blade including a substantially thin flat elongated body having a leading edge and a trailing edge; said sharpening tool comprising a frame, a base member integrally attached to said frame and including a substantially flat blade engaging surface, a guide member rotatably mounted from said base member projecting from and at a certain position on said surface, the axis of rotation of said guide member being substantially perpendicular to said surface, abrading means including an electric motor having a grinding wheel attached thereto and adapted to be driven by said motor, mounting means pivotally mounting said abrading means from said frame for pivotally moving said grinding wheel obliquely of said surface with said axis of rotation of said wheel being angularly disposed relative to said surface and in a plane substantially perpendicularly to the plane of said surface, a handle attached to said frame, an actuating means mounted from said handle and connected to said abrading means for pivotally moving said grinding wheel, said tool being adapted to slidably and supportingly engage the blade on said flat surface with said guide member rollingly engaging said trailing edge, said tool being operable by manipulating said actuating means to move said grinding wheel against said leading edge of the blade for grinding the leading edge by manually moving said tool along the blade.

2. A tool for use in sharpening the blade of a rotary type lawnmower comprising a base member for sliding along the length of said blade in flat face-to-face engagement therewith, a guide member, mounting means rotatably mounting said guide member on said base member for rolling engagement with the back edge of said blade, a grinding wheel adjacent the front edge of said blade, a motor including a rotatable shaft, means mounting said grinding wheel on said shaft for rotation therewith, a frame rigidly attached to said base member and extending angularly therefrom, hinge means including a first hinge half attached to said frame and a second hinge half atached to said motor for pivotally mounting said motor from said frame, a handle attached to said frame, actuating means mounted on said handle and coupled to said second hinge half for moving said motor to carry said grinding wheel in directions towards and away from said guide member for causing engaging and sharpening of the front edge of said blade as said tool is moved along said blade.

3. The device of claim 2 in which said mounting means is selectively movable to a plurality of positions at different distances from said grinding wheel for accommodating different widths of lawnmower blades.

4. A tool for use in sharpening the blade of a rotary type lawnmower comprising a base member for sliding along the length of said blade, a guide member mounted on said base member for engaging the back edge of said blade, a grinding wheel, a hand drill motor including a rotatable shaft, means mounting said grinding wheel on said shaft for rotation therewith, a frame rigidly attached to said base member, hinge means including a first hinge half attached to said frame and a second hinge half, means removably mounting said drill motor on said second hinge half whereby said drill motor is pivotally mounted from said frame, actuating means coupled to said second hinge half for moving said drill motor to carry said grinding wheel into and out of sharpening engagement with the front edge of said blade.

References Cited in the file of this patent

UNITED STATES PATENTS

| | | |
|---|---|---|
| 2,109,107 | Eadie | Feb. 22, 1938 |
| 2,826,032 | Hayes | Mar. 11, 1958 |
| 2,897,640 | Hermann et al | Aug. 4, 1959 |
| 2,921,416 | Shanahan | Jan. 19, 1960 |
| 2,993,312 | Holland et al. | July 25, 1961 |
| 3,089,286 | Ulrich | May 14, 1963 |